United States Patent Office 3,352,916
Patented Nov. 14, 1967

3,352,916
AMINATED POLYOXYALKYLENE FATTY AMINES
John D. Zech, Wilmington, Del., assignor to Atlas Chemical Industries, Inc., Wilmington, Del., a corporation of Delaware
No Drawing. Filed Apr. 15, 1964, Ser. No. 360,125
7 Claims. (Cl. 260—584)

ABSTRACT OF THE DISCLOSURE

Aminated polyoxyalkylene amines prepared by reacting a polyoxyalklene derivative of an amine with an aminating agent. The polyoxyalkylene derivative of an amine may contain a 1 to 20 carbon atom aliphatic radical and from 2 to 20 moles of alkylene oxide units for each equivalent of amino hydrogen in the amine. The aminating agent may be ammonia, primary amines, or secondary amines. The reaction may be carried out in the presence of a hydrogenation catalyst and at a temperature from about 175° C. to 275° C. The aminated polyoxyalkylene amines are useful as chemical intermediates, for example, as modifiers in polyurethane compositions, coatings, casting, fibers and foams. The aminated polyoxyalkylene amines may be reacted with acids to form amides and amine salts which are useful as surfactants.

The present invention relates to aminated polyoxyalkylene fatty amines and in particular, to a reaction product of a polyoxyalkylene derivative of a fatty amine and an aminating agent.

The amines of the present invention are soluble in aqueous and oleaginous media and are useful in the solubilization of other materials, for example, as an emulsifier for insecticides and herbicides, and as a detergent additive for lubricating oils. The present amines are also useful chemical intermediates, for example, as modifiers in polyurethane compositions, coatings, castings, fibers, and foams. The present amines may be reacted with carboxylic acids to form amides or with acids to form amine salts. Both the amides and amine salts are useful as surfactants.

In accord with the present invention a reaction product of (1) a polyoxyalkylene derivative of an amine containing (a) a 10 to 20 carbon atom aliphatic radical, and (b) from 2 to 20 moles of alkylene oxide units selected from the group consisting of ethylene oxide units and propylene oxide units for each equivalent of amino hydrogen in the amine, with (2) an aminating agent selected from the group consisting of ammonia, primary amines and secondary amines. Suitable primary and secondary amines preferably contain from 1 to 6 carbon atoms.

Examples of polyoxyalkylene derivatives of fatty amines which may aptly be used in the present invention are polyoxyalklene derivatives of the following: lauryl amine, myristyl amine, cetyl amine, stearyl amine, aleyl amine, fatty alkyl derivatives of polyalkylene polyamines, such as, ethylene diamine, diethylene triamine, triethylene tetramine, tetraethylene pentamine, propylene diamine, dipropylene triamine, amino-ethyl piperazine; and amines having one or more fatty alkyl radicals attached to an N and at least two amino hydrogen atoms available for oxyalkylation. Illustrative of this class of the fatty polyamines are the Duomeen materials and the Armeen materials, for example, Duomeen C, Duomeen O, Duomeen S, Duomeen T, Armeen HT, Armeen T, Armeen S and Armeen SD. The Duomeen materials are a series of N-alkyl trimethylene diamines having the general structure of $RNH(CH_2)_3NH_2$ in which R is an alkyl group derived from coconut, soya, or tallow fatty acids. The Armeen materials are a series of primary amines possessing aliplhatic chains ranging from 8 to 18 carbons and certain mixtures of these homologues derived from fats. Also suited are the Diam materials, for example, Diam 21 and Diam 26. Other useful fatty polyamines are, for example, N-lauryl ethylene diamine, N,N-distearyl ethylene diamine, N-cetyl diethylene triamine, N-oleyl dipropylene triamine, N,N'-dilauryl diethylene triamine, N-octadecyl, N-B aminoethyl piperazine, N-octadecyl triethylene tetramine, N,N'-di-cetyl triethylene tetramine, and N,N',N''-tri-lauryl tetraethylene pentamine.

The oxyalkylene fatty alkyl amine derivative is aminated with a suitable aminating agent, for example, ammoniia, primary amines and secondary amines. Suitably the primary and secondary amines contain from 1 to 6 carbon atoms. Suitable aminating agents include ammonia, methyl amine, dimethyl amine, ethyl amine, diethyl amine, ethylene diamine, diethylene triamine, triethylene tetramine, and tetraethylene pentamine. The reaction is suitably carried out for a sufficient time to replace at least 50% of the hydroxyl groups with amino groups which may be primary, secondary or tertiary or a mixture of all three types. When ammonia is used as the aminating agent, secondary and tertiary amine formation comes about by polycondensation and/or rearrangement. Formation of these products can be suppressed to a degree by the use of excess ammonia which favors primary amine formation.

While generally Raney-type metal hydrogenation catalysts are useful in carrying out the amination step of the present invention, good results are usually obtained when Raney nickel or Raney cobalt are employed. Sufficient catalyst is generally used to catalyze the process at a reasonable rate. Generally amounts upwards from about 0.5% by weight of the polyoxyalkylene derivative of a fatty amine starting material is sufficient to fulfill this requirement. Generally amounts of catalyst over about 5.0% by weight of the starting material yield no obvious improvement.

In carrying out the amination reaction of the present invention, it is desirable to avoid unduly high temperatures which would reduce the yield of the aminated polyoxyalkylene fatty amine product by scission. The present invention, therefore, utilizes temperatures which are sufficiently high to carry out the amination reaction at a reasonable rate but not high enough to cause undue decomposition of the starting material or product. Temperatures of up to about 275° C. generally may be employed without difficulty due to decomposition. Temperatures of 175° C. and higher generally cause the reaction to proceed at practicable rates. A temperature range of between about 200° C. and about 250° C. has been found to be eminently suited for carrying out the amination reaction of the present invention. The pressure at which the amination reaction is carried out is not critical within a rather large pressure range, for example, although pressures of below atmospheric are generally suitable atmospheric pressures or pressures above atmospheric are suitably employed with equal suitability.

After the amination reaction, the aminated reaction product may be recovered by filtering the catalyst out and then stripping off any water or other volatile components. Preferably this step is carried out under vacuum. The reaction product has a high molecular weight and a low volatility and may easily be recovered as residue. The aminated product is a complex mixture of primary, secondary and tertiary polyamines and may not be readily separated because of the high molecular weight and complex and somewhat polymeric nature of the components.

The following examples are illustrative of the process of the present invention:

EXAMPLE 1

Armeen TD, as used in this and in the following examples, consists of 97% by weight of a primary amine by titration, has a mol combining weight of 271, a M.P. of approximately 41° C. and the primary amine portion has a mean mol weight of 263 and is composed of approximately 30% by weight hexadecyl, 25% octadecyl and 45% octadecenyl amines.

803 grams of polyoxyethylene 20 Armeen TD were placed in an autoclave along with 15 cc. of Raney nickel catalyst and 157 grams of ammonia and the mixture heated in the range of from 245 to 255° C. for a period of 4 hours. After the reaction period the autoclave product was filtered to remove the catalyst and then stripped of volatiles and water. The resulting aminated polyoxyethylene fatty amine product was a thick liquid, clear in color having a hydroxyl number of 98 and containing 2.64% by weight of nitrogen.

EXAMPLE 2

870 grams of polyoxyethylene 20 Armeen TD were placed in an autoclave along with 15 cc. of Raney nickel catalyst and 155 grams of diethylene triamine. The mixture was then heated in the range of from 243 to 250 for a period of 4 hours. After the reaction period the autoclave product was filtered to remove the catalyst and then stripped to remove any remaining volatiles and water. The resulting reaction product was a very thick liquid, becoming semi-solid on standing and having a hydroxyl number of 120 and containing 2.38% by weight of nitrogen.

EXAMPLE 3

1527 grams of polyoxyethylene 5 Armeen TD were placed in an autoclave along with 40 grams of Raney nickel catalyst, 50 cc. of water and 430 grams of ammonia. The mixture was heated for 4½ hours at a temperature of 250° C. After the reaction period the autoclave product was filtered to remove the catalyst and then stripped of volatiles and water. The resulting aminated polyoxyethylene fatty amine product was clear, thick liquid having a hydroxyl number of 229 and containing 4.90% by weight of nitrogen.

EXAMPLE 4

1200 grams of polyoxyethylene 20 Armeen TD were placed in an autoclave with 45 cc. of Raney nickel catalyst, 38 cc. of water and 225 grams of ammonia. The mixture was heated for 5 hours at a temperature of 235° C. After the reaction period the autoclave product was filtered to remove the catalyst and then stripped of volatiles and water. The resulting aminated polyoxyethylene fatty amine product was a clear, thick liquid having a hydroxyl number of 109 and containing 3.35% by weight of nitrogen.

EXAMPLE 5

2233 grams of polyoxyethylene 20 Armeen TD were placed in a flask with 75 grams of Raney nickel catalyst. The mixture was then heated to a temperature of from 215 to 220° C. while passing a stream of ammonia gas therethrough. After 3½ hours of heating, a first portion of 1096 grams of reaction product was removed from the autoclave, and was filtered and stripped as in Example 1. The product was a thick, clear liquid and was found to contain 2.29% by weight of nitrogen and have a hydroxyl number of 80. After 5 hours of heating a second portion of reaction product, 950 grams, was removed from the autoclave and was filtered and stripped as in Example 1. The product was a thick, clear liquid and was found to contain 2.53% by weight of nitrogen and have a hydroxyl number of 73.

What is claimed is:
1. A composition prepared by reacting
    a polyoxyalkylene derivative of an amine having a 10 to 20 carbon atom aliphatic radical,
    said derivative containing from 2 to 20 moles of alkylene oxide units selected from the group consisting of ethylene oxide units and propylene oxide units for each equivalent of amino hydrogen in said amine, and
    an aminating agent selected from the group consisting of ammonia, primary alkyl amines and secondary alkyl amines, said primary and secondary alkyl amines containing from 1 to 6 carbon atoms, in the presence of a Raney metal hydrogenation catalyst and at a temperature from about 175° C. to about 275° C.
2. The composition of claim 1 wherein the aminating agent is ammonia.
3. The composition of claim 1 wherein the aminating agent is a primary alkyl amine containing from 1 to 6 carbon atoms.
4. The composition of claim 1 wherein the aminating agent is a secondary alkyl amine containing from 1 to 6 carbon atoms.
5. The composition of claim 1 wherein the polyoxyalkylene derivative of an amine has a hexadecyl aliphatic carbon radical.
6. The composition of claim 1 wherein the polyoxyethylene derivative of an amine has an octadecyl aliphatic carbon radical.
7. The composition of claim 1 wherein the polyoxyethylene derivative of an amine has an octadecenyl aliphatic carbon radical.

References Cited

UNITED STATES PATENTS 3,029,208    4/1962    Khawam _____ 260—584 X

CHARLES B. PARKER, *Primary Examiner.*

R. L. RAYMOND, *Assistant Examiner.*